United States Patent
Imaizumi et al.

(10) Patent No.: US 6,199,882 B1
(45) Date of Patent: Mar. 13, 2001

(54) VEHICLE WHEEL SUSPENSION

(75) Inventors: Toshiyuki Imaizumi, Toyoake; Toshiho Aoyama, Nagoya; Shuji Kamiya, Kariya; Takashi Gotoh, Chiryu; Koichi Irie, Toyoake, all of (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/359,643

(22) Filed: Jul. 26, 1999

(30) Foreign Application Priority Data

Jul. 31, 1998 (JP) .................................. 10-230312
May 20, 1999 (JP) .................................. 11-140650

(51) Int. Cl.[7] .................................. B60G 15/00
(52) U.S. Cl. ..................... 280/124.146; 280/124.179
(58) Field of Search ..................... 280/124.145, 124.146, 280/124.174

(56) References Cited

U.S. PATENT DOCUMENTS

| 3,573,880 | * | 4/1971 | Sakai | 280/124.146 |
| 4,341,396 | * | 7/1982 | Decouzon et al. | 280/124.145 |
| 4,377,298 | * | 3/1983 | Finn et al. | 280/124.145 |
| 4,903,985 | | 2/1990 | Muhr et al. | 280/124.145 |
| 5,048,859 | * | 9/1991 | Nishikuma et al. | 280/124.146 |

FOREIGN PATENT DOCUMENTS

| 42 03 658 A1 | 12/1993 | (DE) . |
| 2 540 586 A1 | 8/1984 | (EP) . |
| 0 526 689 A1 | 2/1993 | (EP) . |
| 0 728 602 A1 | 2/1996 | (EP) . |
| 0 791 491 A1 | 8/1997 | (EP) . |
| 2 670 437 | 6/1992 | (FR) . |
| 2 742 830 A1 | 6/1997 | (FR) . |
| 1193713 | 7/1970 | (GB) . |
| 1198713 | 7/1970 | (GB) . |
| 34 038 82 A1 | 8/1984 | (GB) . |
| 48-39290 | 11/1973 | (JP) . |
| 8-142622 | 6/1996 | (JP) . |
| 9-2642163 | 5/1997 | (JP) . |

OTHER PUBLICATIONS

Satoshi Suzuki et al., "Approaches to Minimizing Side Force of Helical Coil Springs for Riding Comfort" Feb. 26–29, 1996, pp. 15–22.

Satoshi Suzuki et al., "Approaches to Minimizing Side Force of Helical Coil Springs in Suspension Design" Aug. 28, 1995, pp. 19–27.

* cited by examiner

Primary Examiner—Kenneth R. Rice
(74) Attorney, Agent, or Firm—Oliff & Berridge, PLC

(57) ABSTRACT

The present invention is directed to a vehicle wheel suspension which includes a strut mounted at the upper end thereof on a vehicle body for supporting a wheel, a lower seat fixed to the strut, an upper seat mounted on the vehicle body, and a helical compression spring mounted between the lower seat and the upper seat, with the strut enclosed in the spring. The spring has a coil axis substantially curved at a predetermined radius of curvature in an unloaded state of the spring. The lower seat is tilted at a first predetermined angle in such a direction that the longitudinal length of the spring at the outside of the vehicle body is shortened when the spring is mounted between the upper seat and the lower seat, and/or the upper seat is tilted at a second predetermined angle in such a direction that the longitudinal length of the spring at the inside of the vehicle body is shortened when the spring is mounted between the upper seat and the lower seat. And, the spring is held in such a state that the coil axis of the spring is curved to extend outside of the vehicle body.

7 Claims, 11 Drawing Sheets

VEHICLE WHEEL SUSPENSION

BACKGROUND OF THE INVENTION

1. Field of the Invention

The present invention relates to a vehicle wheel suspension of a strut type, with a helical compression spring arranged to enclose therein a strut, and more particularly to the strut type suspension for absorbing shocks to a strut smoothly.

2. Description of the Related Arts

With respect to a vehicle wheel suspension, various types of suspension system have been known heretofore. Among them, a strut type suspension with a shock absorber employed as a strut for positioning a wheel is popular. According to the strut type suspension, however, due to a displacement between its load input axis and strut axis, a bending moment is exerted on the strut, with side force acting on a guide and a piston of the strut. This side force prevents the piston from sliding smoothly in the guide to act as the shock absorber. In order to compensate the bending moment, it has been known to arrange a coil axis of a cylindrical helical compression spring to be offset to the strut axis.

In Japanese Utility Model Publication No. 48-39290, for example, proposed is a method for mounting on a vehicle a conventional cylindrical coil spring having a straight coil axis in an unloaded state, to be curved in the direction substantially vertical to the center line of the spring. Also proposed is a method for forming a coil spring with the center line thereof curved in advance in an unloaded state, and mounting it on the vehicle in such a state that the center line is straightened, to produce a moment by reactive side force of the spring. According to those methods, the coil spring is mounted on the vehicle to be elastically deformed in the direction substantially vertical to the center line of the spring, to cause a side load which acts on a shock absorbing strut to produce a moment acting thereon in opposition to a moment caused by reaction force from a road, thereby to reduce the side force which will act on a bush and a piston of the shock absorbing strut.

Also proposed in British Patent No. 1198713 is a strut type vehicle suspension, wherein a coil spring when installed in a suspension assembly is stressed, asymmetrically of its axis so as to impart to a shock absorber a bending moment in opposition to that imparted by a wheel support. In FIG. 2 of the British Patent, there is disclosed a helical spring which is coiled along a substantially straight line, and the two end turns of which are bent over by an angle α° towards one another. The planes which pass through a support surface of the unloaded helical spring converge towards the inside of the vehicle, whereas the spring plates connected to a housing and to a guide rod of the shock absorber, respectively, are arranged to parallel to one another. As a result, it is stated that a greater bias is produced on the half of the helical spring facing the outside of the vehicle than on the half facing the inside of the vehicle, so that a bending moment is exerted by the biasing force, opposite to the bending moment exerted by the wheel load on the shock absorber. FIG. 3 of the British Patent shows a helical spring which is coiled about an arc axis of the unloaded spring, and two support surfaces which extend obliquely at an angle to one another. When the helical spring is fitted between the parallel plates, and the longer surface line of the unloaded helical spring faces the outside of the vehicle, the outer half of the helical spring is compressed to a greater extent than the half which faces the inside of the vehicle. Referring to FIG. 4 of the British Patent, two plates are arranged to extend obliquely at an angle to one another, one being connected to the outer member of the shock absorber and the other to the inner member, the point of intersection of the two planes lying on the outside of the vehicle. And, a straight-coiled, cylindrical helical spring is compressed between the two plates, so that the half of the helical spring facing the outside of the vehicle is compressed to a greater extent than the half facing the inside of the vehicle.

Furthermore, a wheel suspension having a helical compression spring, the center line of which has an approximately S-shaped course in an unloaded state, has been proposed in a Japanese patent No. 2642163, which claims a convention priority to one of two German patent applications to which U.S. Pat. No. 4,903,985 claims the convention priority, having FIG. 6 which is different from its corresponding FIG. 6 in the Japanese patent which was amended in the prosecution before the Japanese Patent Office. According to the Japanese patent, the invention was aimed to enable reduce a side force applied to a piston rod of a shock absorber to a great extent, in view of the fact that because tires are becoming wider and wider, hence shifting the wheel-to-road contact point outward, larger and larger angles between the line of support action and the shock absorber axis arise, so that the helical compression spring can not be positioned as obliquely with respect to the shock absorber axis as would actually be desired. In the Japanese patent, a helical compression spring, the center line of which is curved in an unloaded state, has been disclosed as a prior art in FIG. 5, and about which it is stated that the radius of curvature of the spring center line is constant, and that the line of the spring action is merely shifted from the center line of the helical spring in parallel with each other, so that it is difficult to reduce the side force sufficiently. In other words, it has been concluded in the Japanese patent that the helical compression spring with its center line curved in the unloaded state is not to be employed.

With respect to the strut type suspension, further reduction in size is required, so that it is difficult to compensate the bending moment exerted on the strut due to load from a road, by means of mere improvement to the strut and a supporting mechanism therefor, using a conventional cylindrical helical compression spring. Rather, it is necessary to positively increase the reactive side force of the helical compression spring for use in the strut type suspension. However, according to the structure for forming the coil spring with the center line thereof curved in advance in the unloaded state, and mounting it on the vehicle in such a state that the center line is straightened, as disclosed in Japanese Utility model Publication No. 48-39290, it is extremely difficult to obtain a desired effect. Although the structure of the coil spring for use in the suspension of GB Patent No. 1198713 has been disclosed, it is difficult to mount the spring and hard to expect a desired effect, too. In this respect, it is stated in the Japanese Patent No. 2642163 as described before that it is difficult to achieve the sufficient reduction of the side force acting on the guide portion of the strut and the piston. Furthermore, it is difficult to manufacture the compression spring having the approximately S-shaped center line in the unloaded state as disclosed in the Japanese Patent No. 2642163, which will cause increase in cost.

From the foregoing, it can be concluded that only by curving the helical compression spring as described above, the reaction force axis, or the line of the spring action, is shifted from the coil axis, or the center line of the helical compression spring, in parallel with each other, to be apart from the center line of the end plane of the upper end coil of the helical compression spring, i.e., the upper end plane. As a result, eccentric force will be exerted on the upper seat to deteriorate a structure for supporting the upper seat.

SUMMARY OF THE INVENTION

Accordingly, it is an object of the present invention to provide a vehicle wheel suspension of a strut type for applying a desired side force to a strut by means of a helical compression spring when mounted on a vehicle body, with a simple structure.

In accomplish the above and other objects, a vehicle wheel suspension according to the present invention includes a strut mounted at the upper end thereof on a vehicle body for supporting a wheel, a lower seat fixed to the strut, an upper seat mounted on the vehicle body, and a helical compression spring mounted between the lower seat and the upper seat, with the strut enclosed in the spring. The spring has a coil axis substantially curved at a predetermined radius of curvature in an unloaded state of the spring. The lower seat is tilted at a first predetermined angle in such a direction that the longitudinal length of the spring at the outside of the vehicle body is shortened when the spring is mounted between the upper seat and the lower seat, and/or the upper seat is tilted at a second predetermined angle in such a direction that the longitudinal length of the spring at the inside of the vehicle body is shortened when the spring is mounted between the upper seat and the lower seat. And, the spring is held in such a state that the coil axis of the spring is curved to extend outside of the vehicle body.

For example, in the case where the helical compression spring is arranged in such a state that its coil axis is offset to the strut, the lower seat may be tilted at the first predetermined angle in such a direction that the longitudinal length of the spring at the outside of the vehicle body toward the offset direction is shortened when the spring is mounted between the upper seat and the lower seat, and/or the upper seat is tilted at the second predetermined angle in such a direction that the longitudinal length of the spring at the inside of the vehicle body against the offset direction is shortened when the spring is mounted between the upper seat and the lower seat. In this case, the spring is held in such a state that the direction of the radius of curvature of the coil axis coincides with the direction offset to the strut when the spring mounted. In dependence upon a vehicle body structure in the vicinity of the suspension, however, the lower seat is tilted at the predetermined angle preferably in such a direction that the longitudinal length of the spring at the outside of the vehicle body toward the offset direction is shortened.

Preferably, the helical compression spring has a lower end coil and an upper end coil, at least one of which has an end plane of a deformed configuration and a pitch of approximately zero, and one of the lower seat and the upper seat may include a portion for holding at least a part of periphery of one of the end plane.

The coil axis of the spring may be substantially curved in accordance with at least two radiuses of curvature in the unloaded state of the spring. Or, the coil axis of the spring may comprise a plurality of rectilinear lines connected to be substantially curved at the predetermined radius of curvature in the unloaded state of the spring.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
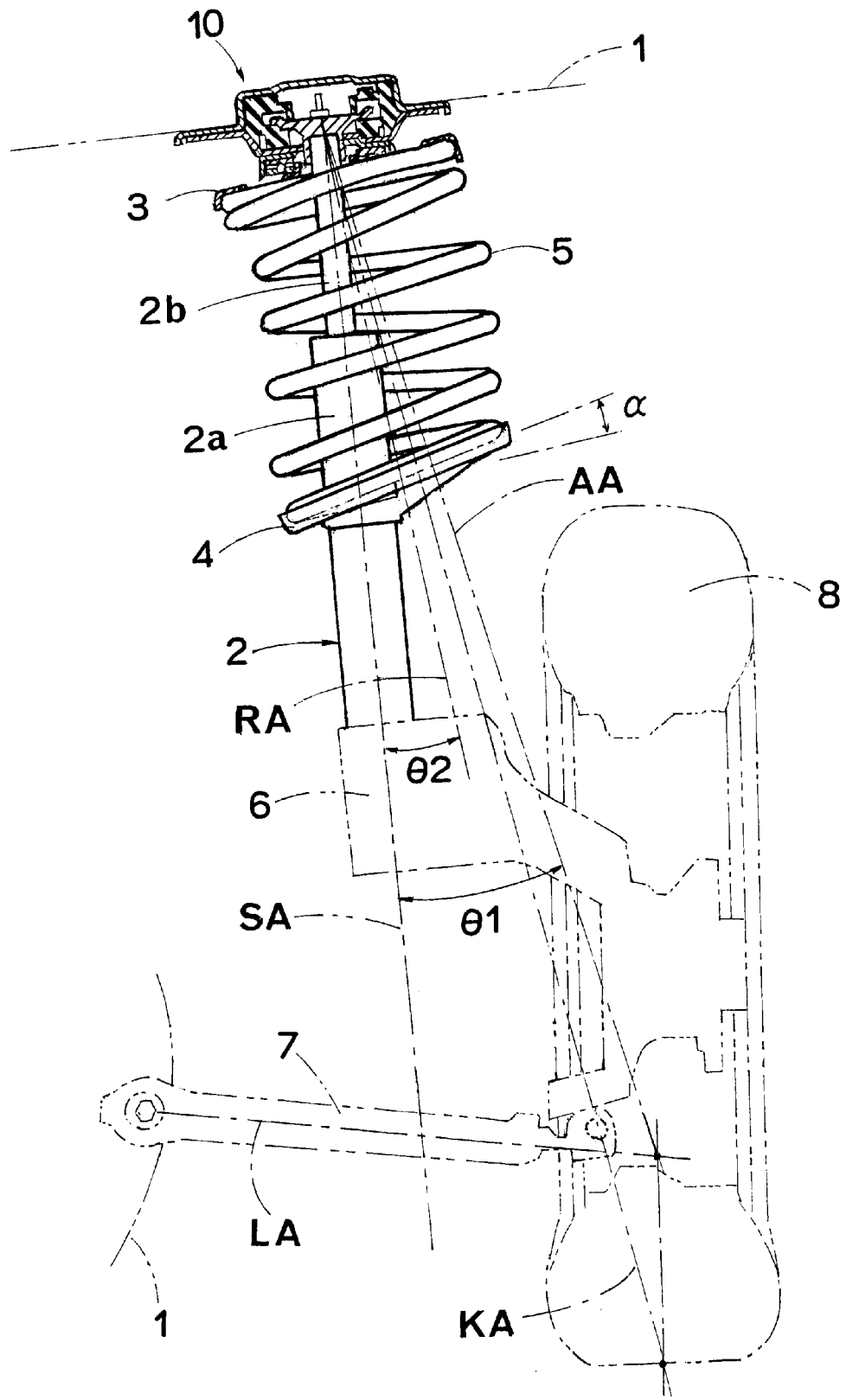
FIG. 1 is a front view of a strut type suspension according to an embodiment of the present invention.
Figure 2:
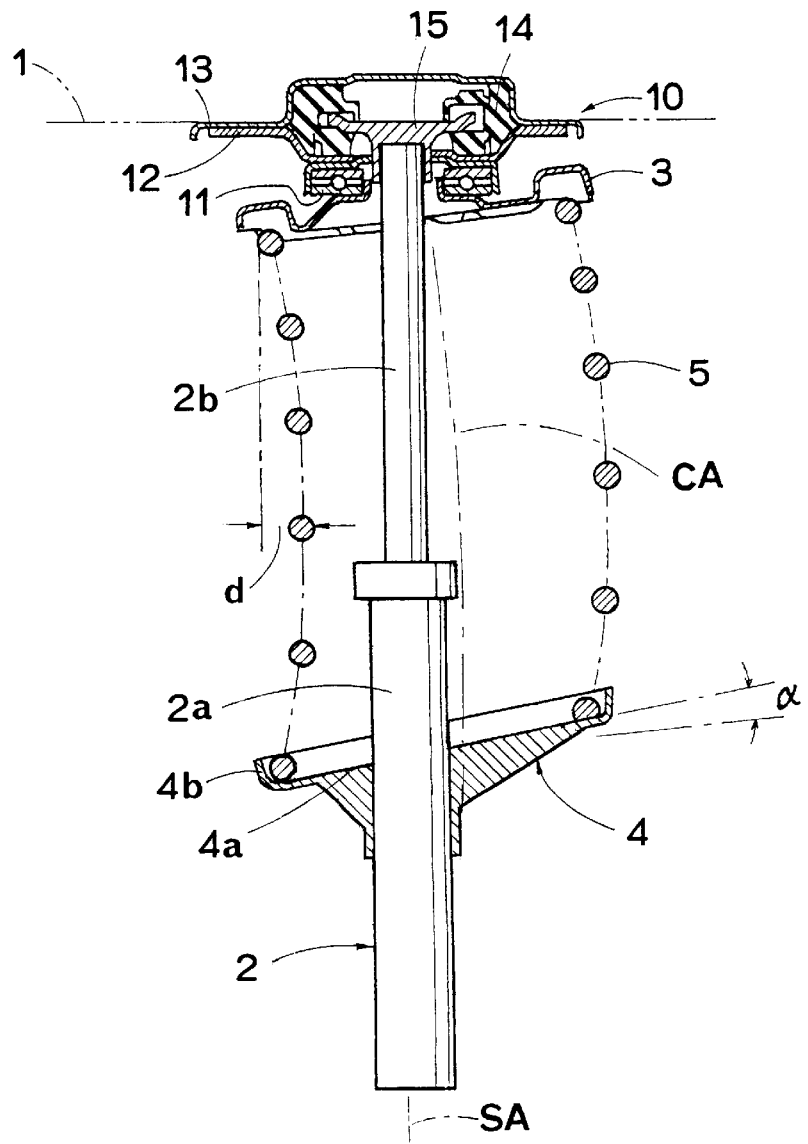
FIG. 2 is an enlarged sectional view of an upper seat, lower seat, and a strut mount according to an embodiment of the present invention.

Referring to FIGS. 1, 2, there is illustrated a vehicle wheel suspension of a strut type, which includes a strut 2, an upper seat 3, a lower seat 4, a helical compression spring 5 (hereinafter, simply referred to as a helical spring 5) and a strut mount 10. As shown in FIG. 1, the strut 2 is elastically mounted at its upper end on a vehicle body 1, and the upper seat 3 is mounted on the vehicle body 1. The lower seat 4 is fixed to a middle portion of the strut 2. Between the upper seat 3 and the lower seat 4, the helical spring 5 is arranged to encircle therein the strut 2. The lower end of the strut 2 is fixed to a knuckle 6, which is pivotally mounted on the vehicle body 1 through a lower arm 7. Accordingly, a wheel 8 is mounted on the knuckle 6, which is connected to the vehicle body 1 through the strut 2 and the helical spring 5, and which is connected to the vehicle body 1 through the lower arm 7. The upper end of the strut 2 and the upper seat 3 are mounted on the vehicle body 1 thorough the strut mount 10, which will be described later in detail.

The strut 2 is provided with a cylinder 2a and a rod 2b which is slidably mounted in the cylinder 2a, to form a shock absorber. The rod 2b is mounted at its upper end on the vehicle body 1 through the strut mount 10, and the cylinder 2a is fixed at its lower end to the knuckle 6, to form a structure similar to that disclosed in the aforementioned Japanese Utility Model No. 48-39290. And, the lower seat 4 is fixed to the cylinder 2a. The helical spring 5 is formed with a coil axis CA thereof passing through the center of the upper end plane curved at a predetermined radius of curvature in an unloaded state of the helical spring 5, to provide an initial curvature of curved amount (d) as shown in FIG. 2. The lower end coil of the helical coil 5 has a lower end plane formed in an oval configuration, and a pitch of approximately zero.

Figure 3:
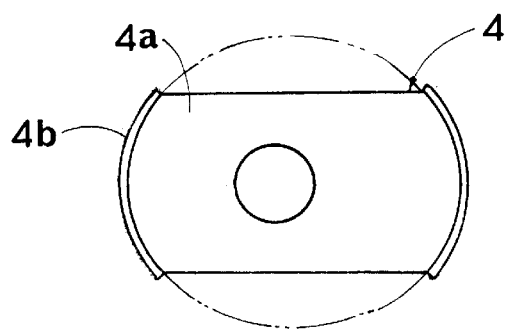
FIG. 3 is a plan view of a lower seat for use in a strut type suspension of an embodiment of the present invention.

The end coil of the helical spring 5 is ended at different positions depending on a shape of the end coil, number of turns of the end coil, and total number of turns. When the helical spring 5 is mounted between the lower seat and upper seat, therefore, the direction of reactive side force exerted on the helical spring 5 is not constant. Consequently, various seats have to be prepared for the helical springs with different properties, to cause increase in assembling time and cost. In order to avoid the inconvenience in assembling the helical spring 5 as described above, the lower seat 4 for use in the present embodiment is formed as shown in FIGS. 2 and 3. That is, the lower seat 4 has a planar portion 4a formed in an oval configuration, arch ends of which are formed with holding portions 4b. The holding portions 4b are peripheral walls elevated from the periphery of the planar portion 4a to be fitted with the opposite peripheral portions on the major axis of the oval lower end plane of the helical spring 5. The lower seat 4 is fixed to the cylinder 2a of the strut 2 so as to be tilted at a predetermined angle α in the direction for shortening the longitudinal length of the helical spring 5 at the outside of the vehicle body. In the case where the helical spring 5 is arranged to be offset to the strut 2, as shown in FIG. 2, the lower seat 4 is supported to be tilted at the predetermined angle α in the direction for shortening the longitudinal length of the helical spring 5 at the outside of the vehicle body toward the offset direction (right side in FIG. 2) when the helical spring 5 is mounted between the upper seat 3 and the lower seat 4. The configuration of the planar portion 4a of the lower seat 4 and that of the lower end plane of the helical spring 5 may be made in any shapes other than a circle, so that they are not necessarily to be formed in the oval configuration, but may be deformed to provide any configuration.

When the helical spring 5 is arranged between the upper seat 3 and the lower seat 4 as shown in FIG. 2, it is held by holding portions 4b to be held in a predetermined arrangement. That is, the lower seat 4 is tilted at the predetermined angle α in such a direction that the longitudinal length of the spring 5 at the outside of the vehicle body is shortened, comparing with the length in its unloaded state. As a result, the helical spring 5 is held to be compressed with a larger compression force exerted at the right side in FIG. 2 than the compression force exerted at the left side in FIG. 2.

The strut mount 10 includes a lower bracket 12 for mounting the upper seat 3 on the vehicle body 1 through a bearing 11, an upper bracket 13 connected by bolts (not shown) to the vehicle body 1 together with the lower bracket 12, and a damper rubber 14 disposed between the lower bracket 12 and the upper bracket 13. According to the present embodiment, therefore, the strut mount 10 is of a type with load transmitted separately, wherein the strut 2 is mounted on the vehicle body 1 through the damper rubber 14, whereas the helical spring 5 is mounted on the vehicle body 1 through the bearing 11. As a result, any stress which is caused when the helical spring 5 is compressed and expanded can be absorbed properly. The damper rubber 14 is designed to pass the reaction force axis of the helical spring 5 through approximately the center of the upper end plane.

Figure 4:
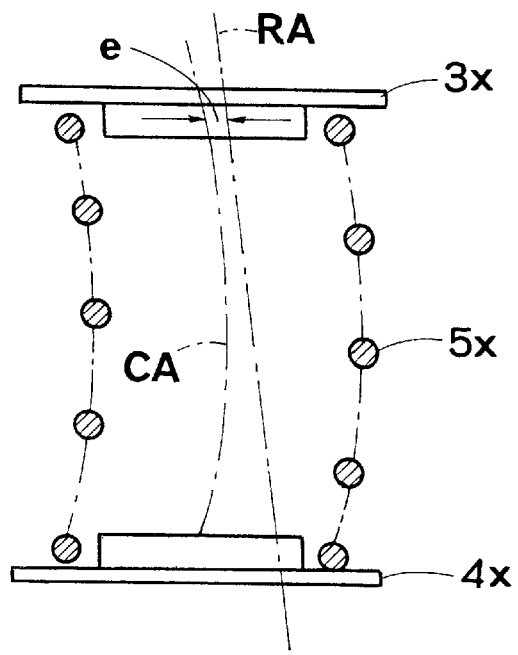
FIG. 4 is a sectional view of one example of supporting structure of a helical compression spring to be compared with the present invention.
Figure 5:
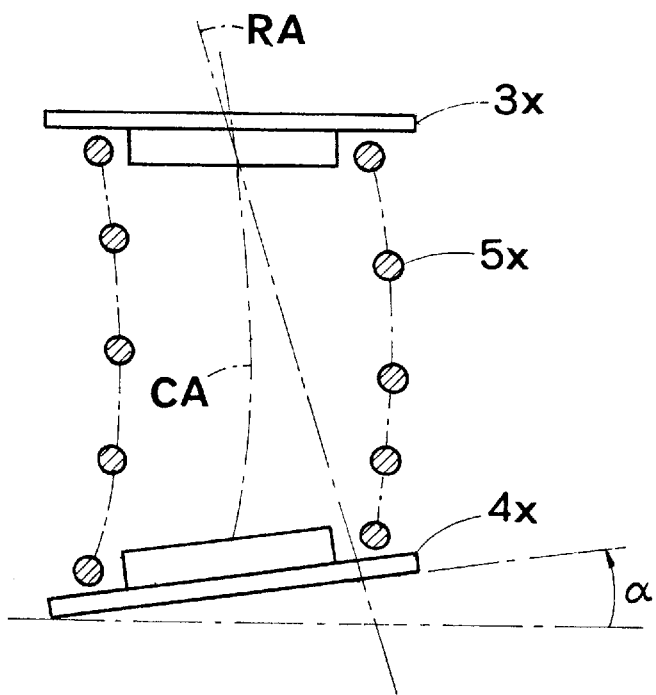
FIG. 5 is a sectional view of supporting structure of a helical compression spring according to an embodiment of the present invention.

In the mean time, only by initially curving a helical compression spring 5x as shown in FIG. 4 for example, the reaction force axis RA is shifted parallel, so that the point of application of the reaction force is displaced from the coil axis CA by a displacement as indicated by "e" in FIG. 4, which might cause eccentric wear on the bearing 11 (shown in FIG. 2). In contrast to the helical spring as shown in FIG. 4, according to the present embodiment, the point of application of the reaction force is positioned approximately on the center of the upper end plane, and at the same time it is positioned approximately on the coil axis CA in the same manner as the helical spring 5x as shown in FIG. 5. Therefore, the side force will be applied to the strut 2 without causing any eccentric wear on the bearing 11, as will be described later in detail with reference to FIGS. 12–14.

According to the suspension as shown in FIG. 1, the reaction force axis RA does not coincide with the load input axis AA. That is, the strut axis SA of the strut 2 and the load input axis AA form an angle θ1, whereas the strut axis SA and the reaction force axis RA form an angle θ2. In FIG. 1, "LA" designates the axis of the lower arm 7, "KA" designates the axis of a king pin (not shown). Due to the relationship between the reaction force axis RA and the strut axis SA which do not coincide with each other, sliding resistance may be caused between the cylinder 2a and the rod 2b of the strut 2. However, the sliding resistance will be compensated by the biasing force of the helical spring 5 to ensure a smooth sliding motion of the rod 2b, as will be described later.

Figure 6:
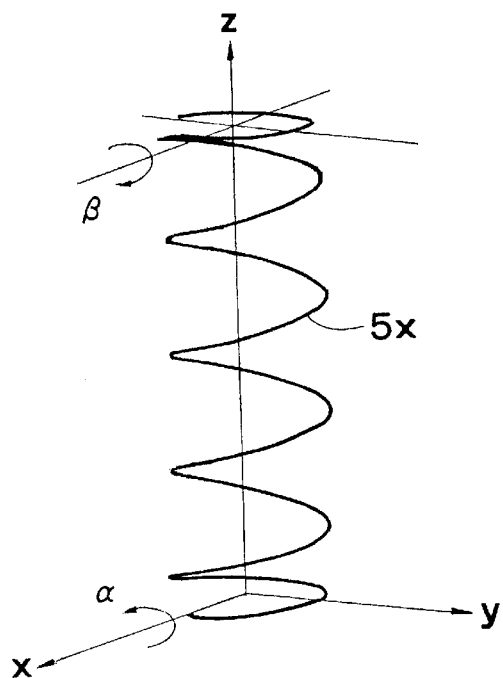
FIG. 6 is a perspective view showing a model of helical compression spring for experimenting a helical compression spring with an initial curvature to investigate influence on spring reaction force by tilting a lower end plane and/or an upper end plane of the spring.

FIG. 6 illustrates a model of helical compression spring 5x, which is used for experimenting the helical compression spring with the initial curvature, the coil axis of which passes the center of the upper end plane and curves in accordance with a predetermined radius of curvature in an unloaded state, to investigate the influence on the spring reaction force by tilting the lower seat, and/or by tilting the upper seat. Hereinafter, will be described results of the experiments in the case where the helical spring 5x is compressed to shorten the longitudinal length of either side of the helical spring 5x, i.e., the lower end plane of the helical spring 5x is rotated about the x-axis counterclockwise by α degree as shown in FIG. 6, and the case where the upper end plane of the helical spring 5x is rotated about the x-axis clockwise by β degree.

Figure 7:
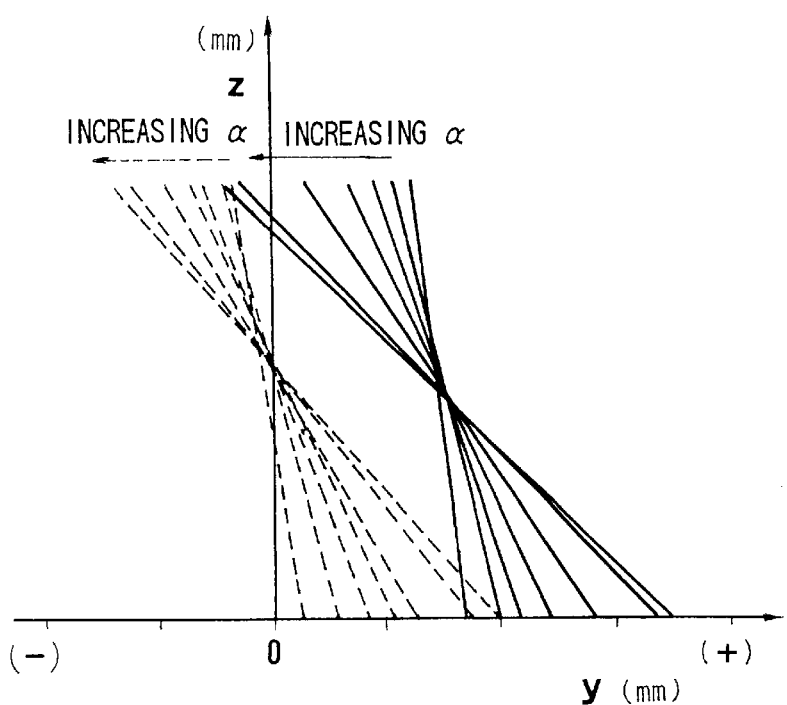
FIG. 7 is a diagram showing a variation of the reaction force axis of the helical spring as shown in FIG. 6 in the case where the lower end plane is rotated about the x-axis counterclockwise with the helical spring compressed to a predetermined height.

In FIG. 7 which shows the result obtained from the experiment, solid lines indicate variation of the reaction force axis of the helical spring 5x, in the case where the lower end plane is rotated about the x-axis counterclockwise, and broken lines indicate variation of the reaction force axis of the conventional helical compression spring in the same case as the former case. When a rotational angle which is rotated about the x-axis in FIG. 6, i.e., tilting angle a of the lower end plane, is increased, the upper end of the reaction force axis will move as indicated by the arrow. The reaction force axis lies on the line for connecting the points of application of the reaction forces acting on the upper end plane and lower end plane.

As shown in FIG. 7, the following results are obtained from the experiment.
(1) By initially curving the helical spring, the reaction force axis of the spring is displaced parallel in the y-direction, i.e., in the direction to which the spring is initially curved to extend.
(2) With increase of the tilting angle α in the counterclockwise direction in FIG. 6, the inclination of the reaction force axis of the spring in the y-direction increases. In other words, the reactive side force of the helical compression spring increases, with increase of the tilting angle α of the lower end plane.
(3) With increase of the tilting angle α of the lower end plane, the point of application of the reaction force on the upper end plane of the helical spring 5x gets close to the center of the upper end plane, i.e., z-axis in FIG. 7, as indicated by the solid lines, whereas the conventional spring gets away from the center of the upper end plane as indicated by the broken lines.

In the case where the upper end plane of the helical spring 5x is rotated clockwise about the x-axis with the helical spring 5x compressed to the predetermined height, the inclination of the reaction force axis of the spring in the y-direction decreases, i.e., the reactive side force of the helical spring 5x decreases, with increase of the tilting angle β of the upper end plane in the clockwise direction (Figure showing this relationship is omitted).

Figure 8:
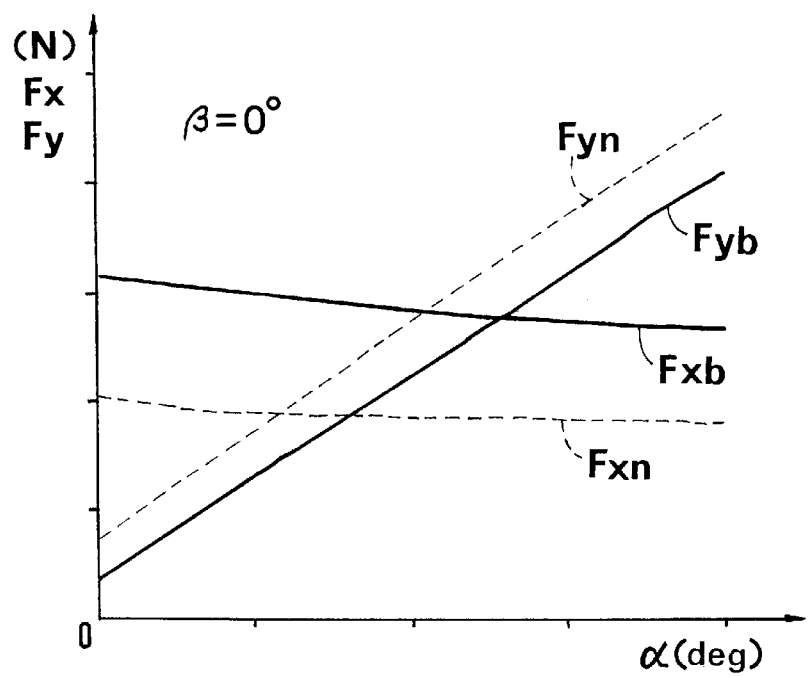
FIG. 8 is a diagram showing a variation of reactive side force of the helical spring as shown in FIG. 6 in the case where the lower end plane is rotated about the x-axis counterclockwise with the helical spring compressed to a predetermined height.

Therefore, in the case where the tilting angle of the upper seat 3 is zero, and the tilting angle of the lower seat 4 is α degree as shown in FIG. 5, i.e., the lower end plane of the helical spring 5x is rotated counterclockwise at α degree in FIG. 6 about the x-axis, with the helical spring 5x compressed to the predetermined height, the reactive side force will be varied as indicated by the solid lines in FIG. 8. The abscissa in FIG. 8 represents the tilting angle α of the lower end plane, and the ordinate represents the side forces Fx, Fy in the x-direction and the y-direction, respectively. Solid lines indicate variations of the reactive side forces Fxb, Fyb of the helical spring 5 according to the present embodiment, whereas the broken lines indicate the variation of the reactive side forces Fxn, Fyn according to the conventional helical compression spring.

As shown in FIG. 8, the following results are obtained.
(1) If the helical spring 5x is initially curved in the y-direction, the reactive side force Fxb in the x-direction is increased, whereas the reactive side force Fyb in the y-direction is decreased, comparing with the reactive side forces Fxn, Fyn of the conventional helical compression spring.
(2) In the case where the lower end plane is rotated about the x-axis counterclockwise in FIG. 6 by the tilting angle α, the reactive side force Fyb in the y-direction is largely increased, with increase of the tilting angle α, whereas the reactive side force Fxb in the x-direction is slightly reduced.
(3) The absolute value of the reactive side force Fxb in the x-direction is not negligible, in order to have the reaction force axis of the spring coincide with an ideal offset line. In this respect, the reactive side force Fxb in the x-direction can be minimized by coinciding the curving direction of the spring with the direction of the reactive side force exerted when the spring is compressed between parallel seats, to adjust the position of end turn of the spring.

Figure 9:
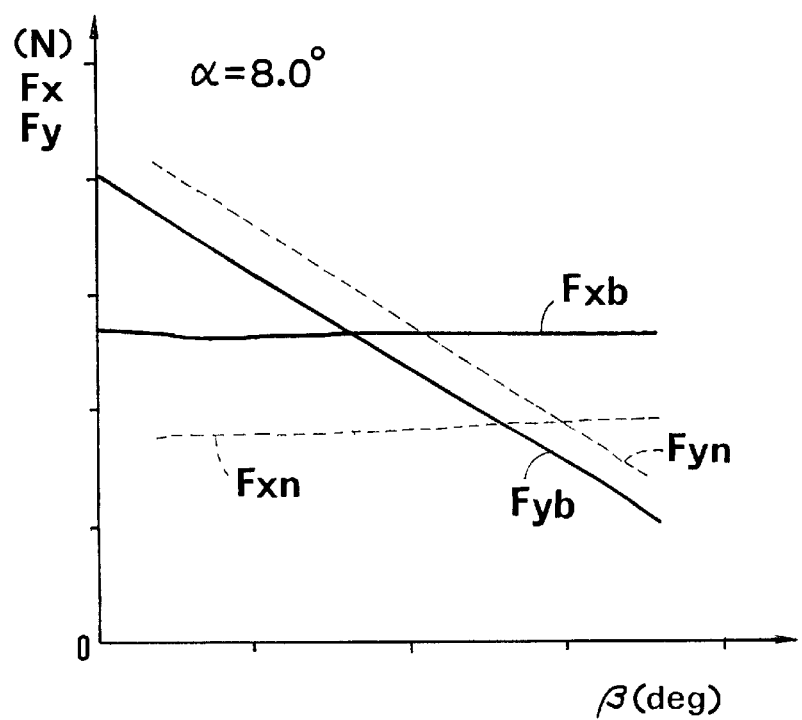
FIG. 9 is a diagram showing a variation of reactive side force of the helical spring as shown in FIG. 6 in the case where the lower end plane is rotated about the x-axis counterclockwise and the upper end plane is rotated about the x-axis clockwise, with the helical spring compressed to a predetermined height.

On the contrary, in the case where the lower end plane of the helical spring 5x is rotated about the x-axis counterclockwise in FIG. 6 by the tilting angle α of 8.0 degree, with the helical spring 5x compressed to the predetermined height, and at the same time the upper end plane of the helical spring 5x is rotated about the x-axis clockwise in FIG. 6, the reactive side forces Fxb, Fyb of the helical spring 5x will vary as indicated by the solid lines in FIG. 9, with increase of the tilting angle β of the upper end plane. The broken lines indicate the variation of the reactive side forces in the same case as the above case. Thus, referring to FIG. 9, it can be concluded that with increase of the tilting angle β of the upper end plane in the clockwise direction, the reactive side forces Fyb, Fyn in the y-direction are largely decreased, and the reactive side forces Fxb, Fxn are slightly increased.

In conclusion, according to the initially curved helical compression spring,
(1) The reaction force axis is shifted parallel in the extending direction of the curved spring.
(2) When the lower end plane is tilted about the x-axis counterclockwise in FIG. 6, the reactive side force in the y-direction is largely increased, and the angle between the coil axis and the reaction force axis of the spring is increased.
(3) In the case where the lower end plane is rotated about the x-axis counterclockwise in FIG. 6 by the tilting angle α, the point of application of the reaction force on the upper end plane gets close to the center of the upper end plane, with increase of the tilting angle α.
(4) If the upper end plane is rotated about the x-axis clockwise in FIG. 6 by the tilting angle β, however, the reactive side force in the y-direction is largely decreased, with increase of the tilting angle β, to compensate the effect obtained when the lower end plane was tilted.
(5) Although the reactive side force in the direction vertical to the extending direction of the curved spring (i.e., the reactive side force in the x-direction) is large in value, it can be reduced as described before, and its variation caused by tilting the end plane will be as small as negligible.

According to the present embodiment, therefore, the curved amount (d) and the tilting angle α of the lower seat 4 are set as shown in FIG. 2, to adjust the reactive side force to the strut 2 appropriately, and adjusted so as to place the point of application of the spring reaction force at approximately the center of the upper seat. Since the lower end coil of the helical spring 5 is held by the holding portions 4b of the lower seat 4, the helical spring 5 is not rotated against the lower seat 4, so that they are held to be positioned in a predetermined relationship with each other.

Figure 10:
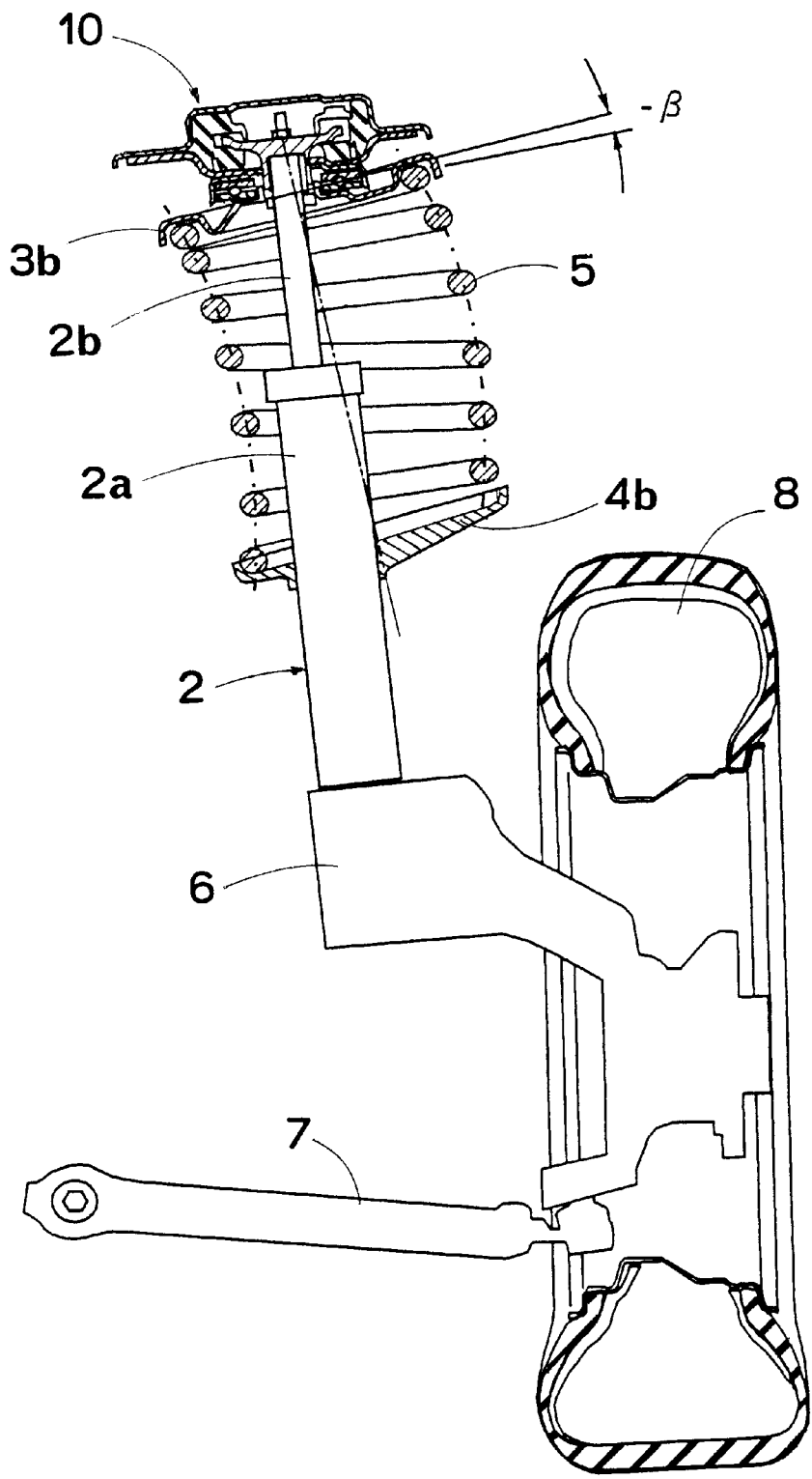
FIG. 10 is a sectional view of a strut type suspension according to another embodiment of the present invention.

FIG. 10 illustrates another embodiment of the present invention, in which the upper seat 3b is tilted to shorten the longitudinal length of the helical spring 5 at the inside of the vehicle body when the helical spring 5 is mounted between the upper seat 3 and the lower seat 4. Practically, the upper seat 3b is tilted at a predetermined angle β in the direction for shortening the longitudinal length of the helical spring 5 at the inside of the vehicle body (i.e., left side in FIG. 10) against the offset direction to the strut 2. In FIG. 10, the angle β is indicated as a negative value (−β) to distinguish it from the angle β as shown in FIG. 6. Then, the helical spring 5 is disposed between the upper seat 3b and the lower seat 4b, to be arranged to coincide the extending direction of the curvature of the coil axis with the outside of the vehicle body. The rest of the elements are substantially the same as the embodiment as described before, so that the elements equivalent to those described originally will be designated by the same reference numerals.

Figure 11:
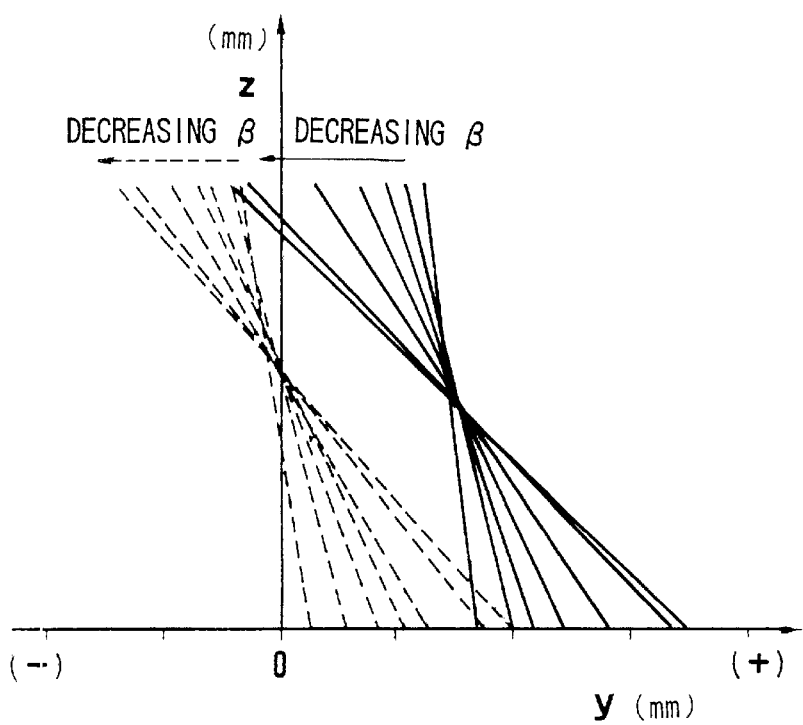
FIG. 11 is a diagram showing a variation of the reaction force axis of the helical spring as shown in FIG. 6 in the case where the upper end plane is rotated about the x-axis counterclockwise with the helical spring compressed to a predetermined height.

In FIG. 11, solid lines indicate variation of the reaction force axis of the helical spring 5x in the case where the upper end plane is rotated about the x-axis counterclockwise with the helical spring 5x compressed to a predetermined height, i.e., a reverse direction to the direction indicated by the arrow in FIG. 6. Since the direction of the arrow in FIG. 6 corresponds to the direction for increasing the tilting angle β, the reverse direction corresponds to the direction for decreasing the tilting angle β. And, the broken lines indicate variation of the reaction force axis of the conventional helical compression spring in the same case as the former case. FIG. 11 shows the variation of the reaction force axis of the spring, when a rotational angle which is rotated about the x-axis in FIG. 11, i.e., tilting angle β of the upper end plane, is increased in the direction opposite to the direction as indicated by the arrow in FIG. 6 (in other words, the decreasing direction of the tilting angle β). By increasing the tilting angle β of the upper end plane in the direction opposite to the clockwise direction as indicated by the arrow in FIG. 6, i.e., counterclockwise direction, the inclination of the spring reaction force in the y-direction will be increased. In other words, the reactive side force of the helical spring 5 is increased, with decrease of the tilting angle β of the upper end plane in the clockwise direction as indicated by the arrow in FIG. 6.

Figure 12:
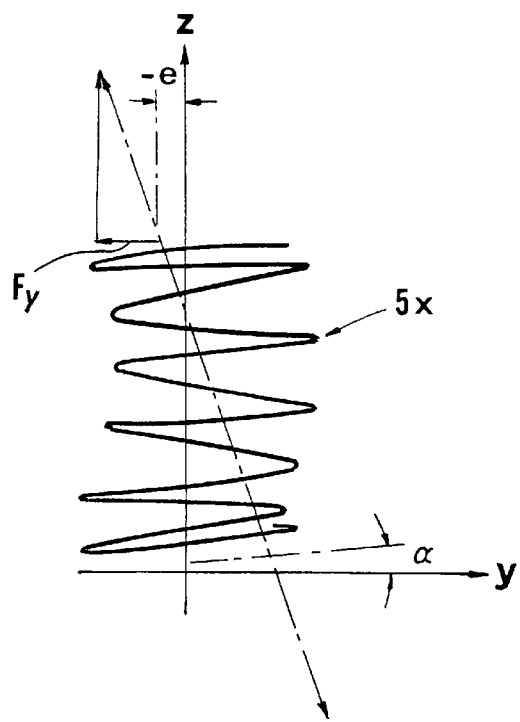
FIG. 12 is a characteristic diagram showing a relationship of reaction force in the case where the lower end plane of the helical spring as shown in FIG. 6 is rotated about the x-axis counterclockwise with the helical spring compressed to a predetermined height.
Figure 13:
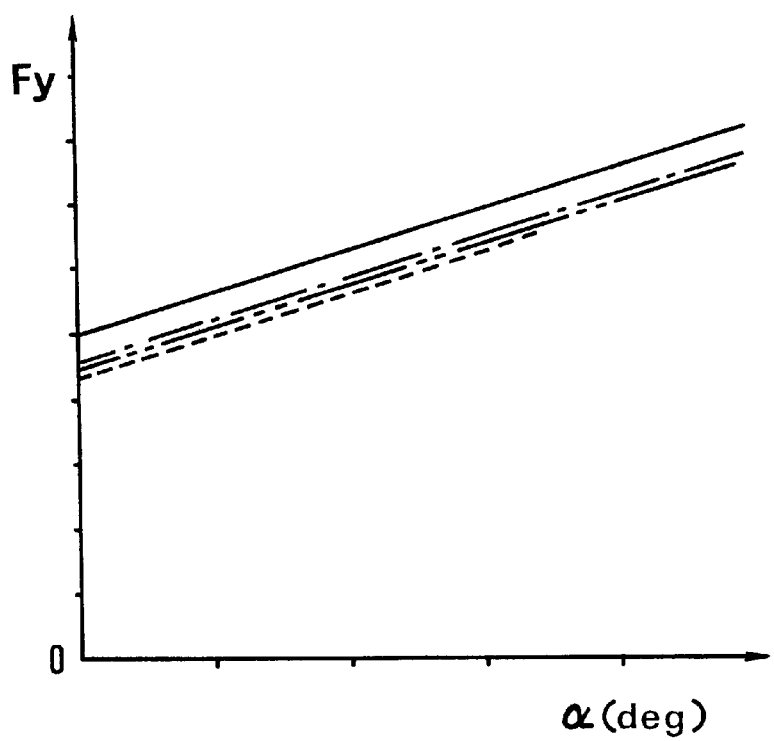
FIG. 13 is a diagram showing a variation of the reactive side force of the helical spring as shown in FIG. 6 in accordance with a tilting angle α of the lower plane, in the case where the lower end plane is rotated about the x-axis counterclockwise with the helical spring compressed to a predetermined height.
Figure 14:
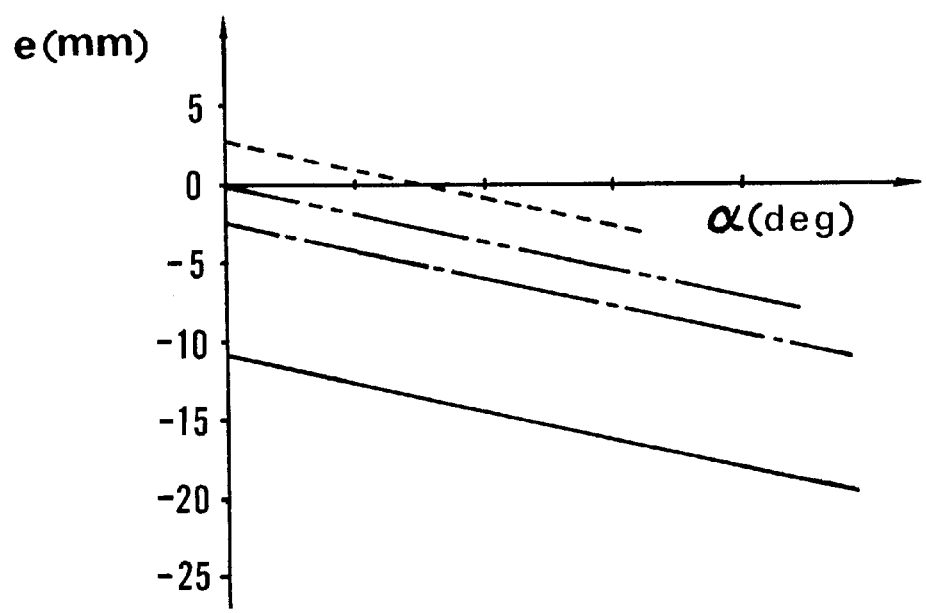
FIG. 14 is a diagram showing a displacement of the point of application of reaction force caused in accordance with a variation of a tilting angle α of the lower plane of the helical spring as shown in FIG. 6, in the case where the lower end plane is rotated about the x-axis counterclockwise with the helical spring compressed to a predetermined height.

Referring to FIGS. 12–14, it can be concluded that by tilting the lower end plane of the helical compression spring 5x with the initial curvature as shown in FIG. 6, the reaction force axis RA will pass approximately the center of the upper end plane. FIG. 12 illustrates a state of forces exerted in the case where the lower end plane of the helical spring 5x as shown in FIG. 6 is rotated about the x-axis counterclockwise in FIG. 6, with the helical spring 5x compressed to the predetermined height. As can be seen in FIGS. 13 and 14, the reactive side force Fy and the displacement (e) of the point of application of force will vary in accordance with the tilting angle α of the lower end plane of the helical spring 5x to the lower seat (not shown in FIG. 12).

FIGS. 13 and 14 show the results obtained from the experiment, wherein solid lines indicate the result of the experiment for a helical compression spring without being curved, one-dot chain lines indicate the result for a helical compression spring which was curved by 10 mm of the curved amount (d), two-dot chain lines indicate the result for a helical compression spring which was curved by 13 mm, and broken lines indicate the result for a helical compression spring which was curved by 16 mm. As can be seen from the results of those experiments, with increase of the radius of curvature, the reactive side force Fy is decreased, and the point of application of force on the upper end plane is sifted in the extending direction of the curvature. And, in the case where the lower end plane is tilted by the tilting angle α, the reactive side force Fy is increased, with increase of the angle α, and the point of application of force on the upper end plane is sifted in the direction opposite to the extending direction of the curvature of the helical spring.

Figure 15:
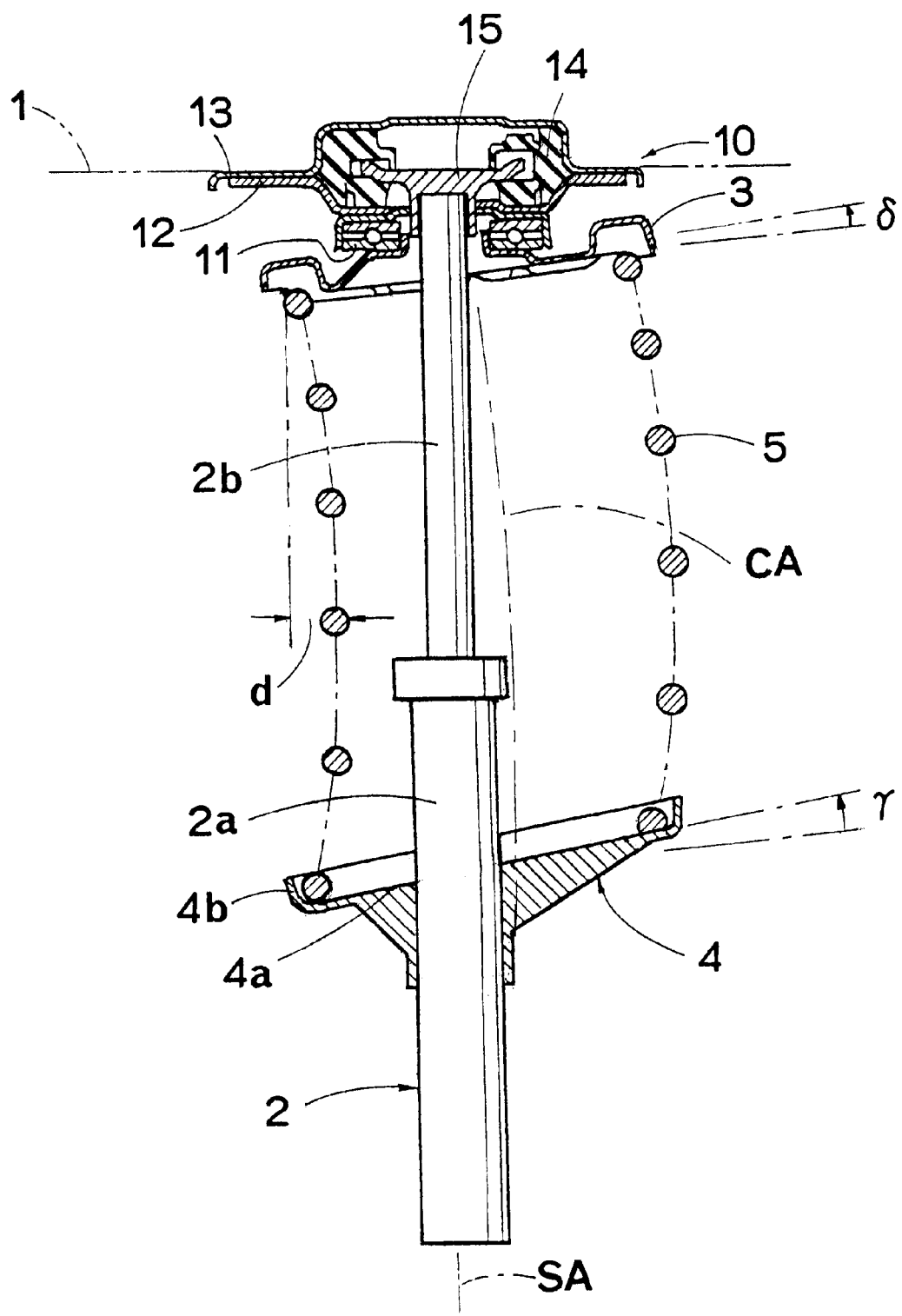
FIG. 15 is a sectional view of a strut type suspension according to a further embodiment of the present invention.
Figure 16:
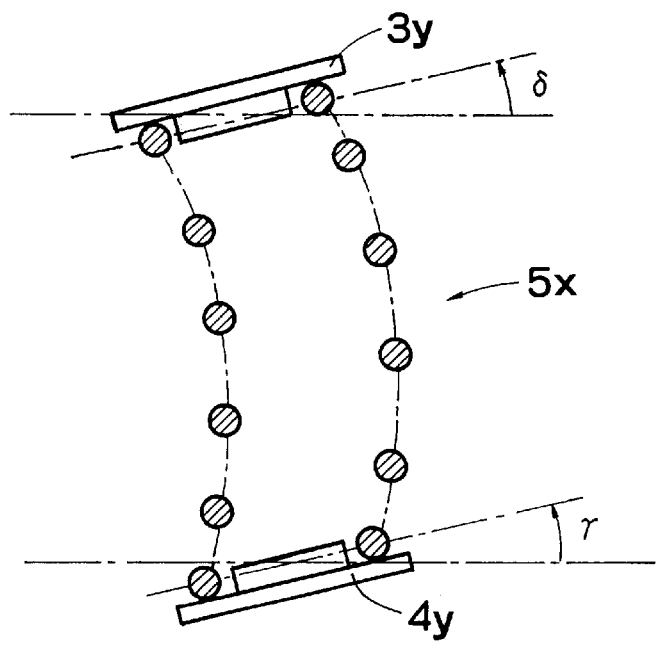
FIG. 16 is a sectional view of one example of a helical compression spring to be compared with the spring as shown in FIG. 15.
Figure 17:
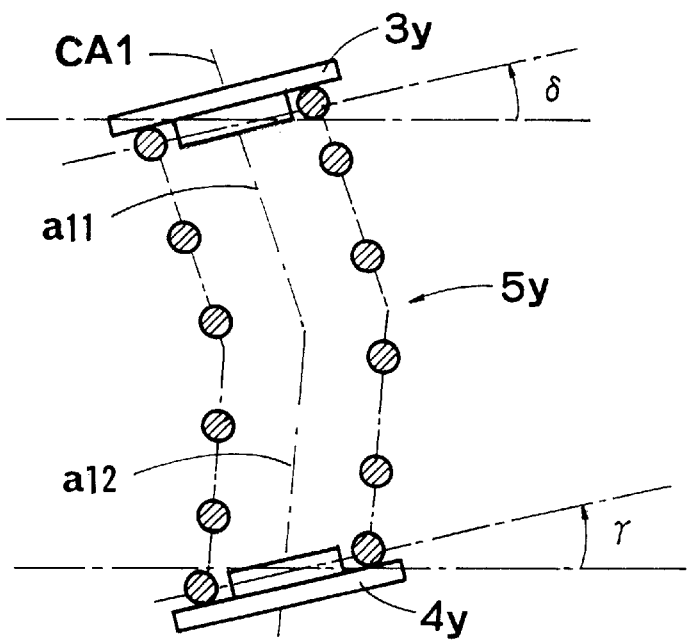
FIG. 17 is a sectional view of another example of a helical compression spring to be compared with the spring as shown in FIG. 16.
Figure 18:
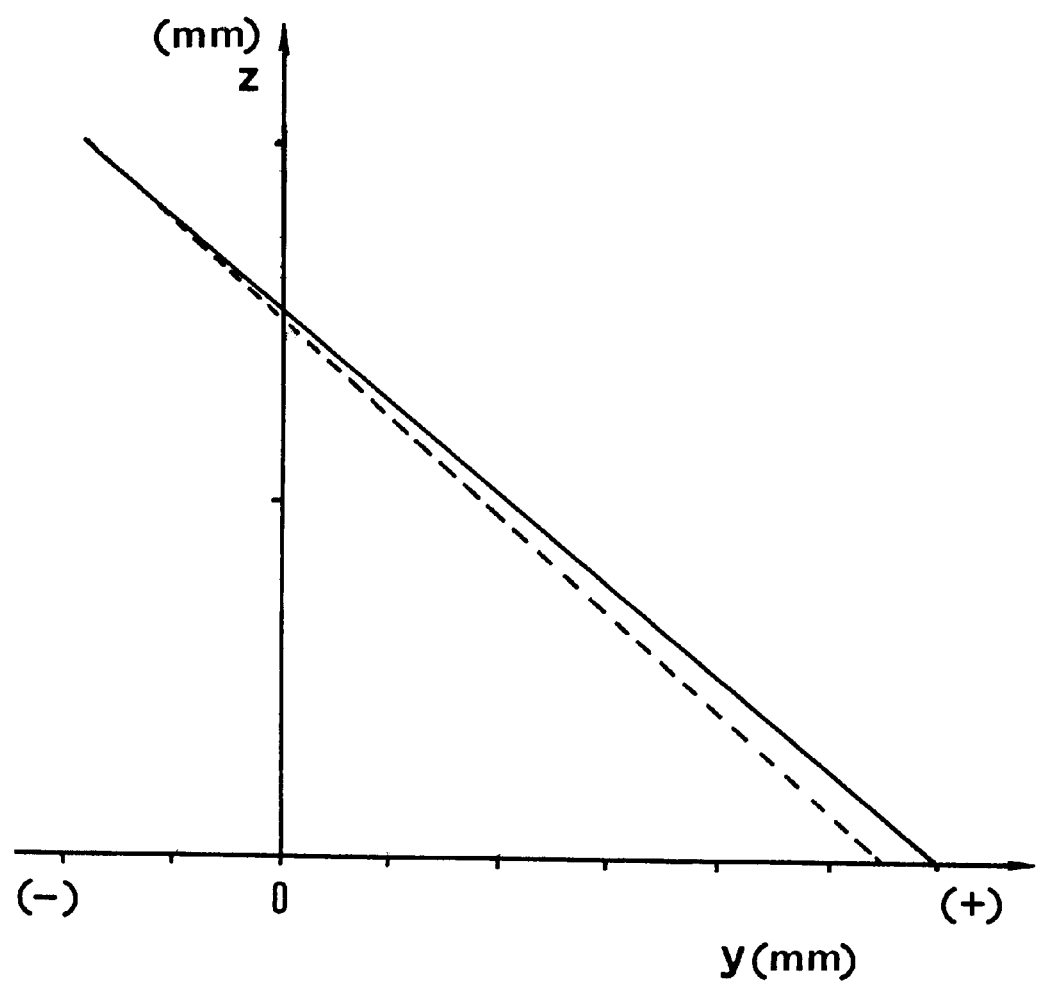
FIG. 18 is a diagram showing variations of the reaction force axes of the helical springs as shown in FIGS. 16 and 17 which are mounted between an upper seat and a lower seat, which are tilted counterclockwise at the angles δ, γ, respectively.

FIG. 15 illustrates a further embodiment of the present invention, in which the lower seat 4b is tilted at a predetermined angle γ in the direction for shortening the longitudinal length of the helical spring 5 at the outside of the vehicle body (i.e., right side in FIG. 15) toward the offset direction to the strut 2, as in the embodiment in FIG. 2, and the upper seat 3b is tilted at a predetermined angle δ in the direction for shortening the longitudinal length of the helical spring 5 at the inside of the vehicle body (i.e., left side in FIG. 15) against the offset direction to the strut 2, as in the embodiment in FIG. 10. According to this embodiment, therefore, the reactive side force to the helical spring 5 can be increased in accordance with the properties as shown in FIGS. 7 and 11 to adjust it to a predetermined reactive side force In the embodiments as described above, the helical spring has the arch coil axis curved at two radiuses of curvature in the unloaded state. The coil axis is not necessarily formed in an arch shape or a circular shape, but may be substantially curved at a predetermined radius of curvature to obtain the same effects as those obtained in the embodiments. As shown in FIG. 17 for example, a coil axis CA1 can be formed by a series of two rectilinear lines a11, a12 to be substantially curved at the predetermined radius of curvature. In FIG. 18, a broken line indicates the reaction force axis of the helical spring 5x which is curved in the arch shape as shown in FIG. 16 and which is mounted between the upper seat 3y and the lower seat 4y, which are tilted counterclockwise at the angles δ, γ, respectively. A solid line in FIG. 18 indicates the reaction force axis of the helical spring 5y which is curved substantially at the predetermined radius of curvature by the rectilinear lines a11, a12 as shown in FIG. 17 and which is mounted between the upper seat 3y and the lower seat 4y, which are tilted counterclockwise at the angles δ, γ, respectively. As can be seen from FIG. 18, according to the helical spring 5y as shown in FIG. 17, which is curved substantially at the predetermined radius of curvature by the rectilinear lines a11, a12, if the substantial radius of curvature of the helical spring 5y is approximately the same in magnitude as the radius of curvature of the helical spring 5x, the reaction force axis of the helical spring 5y will be approximately the same as that of the helical spring 5x.

In stead of the helical spring 5 as shown in FIG. 15, therefore, the coil axis CA1 of the helical spring 5y may be formed to be substantially curved at a predetermined radius of curvature by a series of the rectilinear lines a11, a12, and the lower seat 4y may be tilted at the predetermined angle γ in the direction for shortening the longitudinal length of the outside of the curvature (right side in FIG. 17) of the helical spring 5y, and the upper seat 3y may be tilted at the predetermined angle δ in the direction for shortening the longitudinal length of the inside of the curvature (left side in FIG. 17) of the helical spring 5y, to obtain substantially the same effect as the effect obtained by the structure as shown in FIG. 15. Or, the coil axis may be formed by a series of more than three rectilinear lines (not shown) to be substantially curved at the predetermined radius of curvature.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A vehicle wheel suspension comprising:
    a strut mounted at the upper end thereof on a vehicle body for supporting a wheel;
    a lower seat fixed to said strut;
    an upper seat mounted on said vehicle body; and
    a helical compression spring mounted between said lower seat and said upper seat, with said strut enclosed in said spring, said spring having a coil axis substantially curved at a predetermined radius of curvature in an unloaded state of said spring,
    wherein at least one of lower seat is tilted at a first predetermined angle in such a direction that the longitudinal length of said spring at the outside of said vehicle body is shortened when said spring is mounted between said upper seat and said lower seat, and said upper seat is tilted at a second predetermined angle in such a direction that the longitudinal length of said spring at the inside of said vehicle body is shortened when said spring is mounted between said upper seat and said lower seat,
    and wherein said spring is held in such a state that the coil axis of said spring is curved to extend outside of said vehicle body.

2. The vehicle wheel suspension of claim 1, wherein said helical compression spring has a lower end coil and an upper end coil, at least one of which has an end plane of a deformed configuration and a pitch of approximately zero, and wherein one of said lower seat and said upper seat includes a portion for holding at least a part of periphery of one of said end plane.

3. The vehicle wheel suspension of claim 2, wherein said lower end plane of said helical compression spring is formed in an oval configuration, and wherein said lower seat has holding portions to be fitted with opposite peripheral portions on the major axis of said lower end plane of said spring.

4. The vehicle wheel suspension of claim 3, wherein said holding portions are peripheral walls elevated from the periphery of said lower seat.

5. The vehicle wheel suspension of claim 1, wherein the coil axis of said spring is substantially curved in accordance with at least two radiuses of curvature in the unloaded state of said spring.

6. The vehicle wheel suspension of claim 1, wherein the coil axis of said spring comprises a plurality of rectilinear lines connected to be substantially curved at the predetermined radius of curvature in the unloaded state of said spring.

7. A vehicle wheel suspension comprising:
    a strut mounted at the upper end thereof on a vehicle body for supporting a wheel;
    a lower seat fixed to said strut;
    an upper seat mounted on said vehicle body; and
    a helical compression spring mounted between said lower seat and said upper seat, with said strut enclosed in said spring, said spring having a coil axis substantially curved at a predetermined radius of curvature in an unloaded state of said spring, and said spring being arranged in such a state that the coil axis of said spring is offset to said strut,
    wherein at least one of lower seat is tilted at the first predetermined angle in such a direction that the longitudinal length of said spring at the outside of said vehicle body toward the offset direction is shortened when said spring is mounted between said upper seat and said lower seat, and said upper seat is tilted at the second predetermined angle in such a direction that the longitudinal length of said spring at the inside of said vehicle body against the offset direction is shortened when said spring is mounted between said upper seat and said lower seat,
    and wherein said spring is held in such a state that the direction of the radius of curvature of the axis of said spring coincides with the direction offset to said strut.

* * * * *

(12) EX PARTE REEXAMINATION CERTIFICATE (5440th)
United States Patent
Imaizumi et al.

(10) Number: US 6,199,882 C1
(45) Certificate Issued: Jul. 4, 2006

(54) VEHICLE WHEEL SUSPENSION

(75) Inventors: Toshiyuki Imaizumi, Toyoake (JP); Toshiho Aoyama, Nagoya (JP); Shuji Kamiya, Kariya (JP); Takashi Gotoh, Chiryu (JP); Koichi Irie, Toyoake (JP)

(73) Assignee: Chuo Hatsujo Kabushiki Kaisha, Nagoya (JP)

Reexamination Request:
No. 90/007,376, Jan. 14, 2005

Reexamination Certificate for:
Patent No.: 6,199,882
Issued: Mar. 13, 2001
Appl. No.: 09/359,643
Filed: Jul. 26, 1999

(30) Foreign Application Priority Data

Jul. 31, 1998 (JP) ............................................. 10-230312
May 20, 1999 (JP) ........................................... 11-140650

(51) Int. Cl.
*B60G 15/00* (2006.01)
*B60G 15/07* (2006.01)

(52) U.S. Cl. ........................ 280/124.146; 280/124.154; 280/124.179; 267/179; 267/180

(58) Field of Classification Search .......... 280/124.147, 280/124.154, 124.155; 267/179, 180, 221, 267/286
See application file for complete search history.

(56) References Cited

U.S. PATENT DOCUMENTS 3,573,880 A 4/1971 Sakai
4,903,985 A 2/1990 Muhr et al.

FOREIGN PATENT DOCUMENTS

| EP | 0 526 689 | 2/1993 |
| EP | 0 728 602 | 8/1996 |
| FR | 2 540 586 | 8/1984 |
| FR | 2 742 830 | 6/1997 |
| GB | 1 198 713 | 7/1970 |
| JP | 51-146615 | 5/1975 |
| JP | 60-95311 | 6/1985 |
| JP | 2-049703 | 6/1990 |

OTHER PUBLICATIONS

Nov. 19, 1999 European Search Report, Application No. 99114848.7.
Dec. 21, 2001 European Official Action, Application No. 99114848.7.
Feb. 27, 2004 European Opposition (with translation), Patent No. EP 0976591 B1.
Mar. 3, 2004 Supplement to European Opposition (with translation), Patent No. EP 0976591 B1.
Mar. 23, 2004 European Opposition, Patent No. EP 0976591 B1.
May 11, 2004 Supplement to European Opposition, Patent No. EP 0976591 B1.
Jan. 19, 2005 Reply in European Opposition, Patent No. EP0976591 B1.

(Continued)

*Primary Examiner*—Peter C. English

(57) ABSTRACT

The present invention is directed to a vehicle wheel suspension which includes a strut mounted at the upper end thereof on a vehicle body for supporting a wheel, a lower seat fixed to the strut, an upper seat mounted on the vehicle body, and a helical compression spring mounted between the lower seat and the upper seat, with the strut enclosed in the spring. The spring has a coil axis substantially curved at a predetermined radius of curvature in an unloaded state of the spring. The lower seat is tilted at a first predetermined angle in such a direction that the longitudinal length of the spring at the outside of the vehicle body is shortened when the spring is mounted between the upper seat and the lower seat, and/or the upper seat is tilted at a second predetermined angle in such a direction that the longitudinal length of the spring at the inside of the vehicle body is shortened when the spring is mounted between the upper seat and the lower seat. And, the spring is held in such a state that the coil axis of the spring is curved to extend outside of the vehicle body.

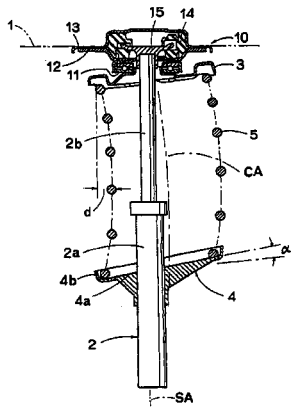

OTHER PUBLICATIONS

Apr. 15, 2004 Japanese Information Submission (with translation), Publication No. 2000–103216.

May 6, 2004 Japanese Information Submission (with translation), Publication No. 2000–103216.

Mar. 16, 2005 Japanese Official Action (with translation), Application No. 11–140650.

Hoesch–Hohenlimburg AG Brochure, "Hoesch Federelemente—Simulationsmodel fur Schraubenfedern" (trans. "Hoesch spring elements—simulation model for helical springs"), distributed 1991 Frankfurt International Car Show.

Mar. 17, 2005 Supplement to European Opposition (with translation), Patent No. EP0976591 B1.

Mar. 31, 2005 Summons to Attend Oral Hearings and Preliminary Evaluation of European Opposition Proceedings, Patent No. EP 0976591 B1.

Translation of: Hoesch–Hohenlimburg AG Brochure, "Hoesch Federelemente—Simulationsmodel fur Schraubenfedern" (trans. "Hoesch spring elements—simulation model for helical springs"), distributed 1991 Frankfurt International Car Show.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *